Aug. 1, 1933.                R. H. WHITE                1,920,225
                        TRACTOR LUBRICATING SYSTEM
                          Filed May 29, 1930          2 Sheets-Sheet 1
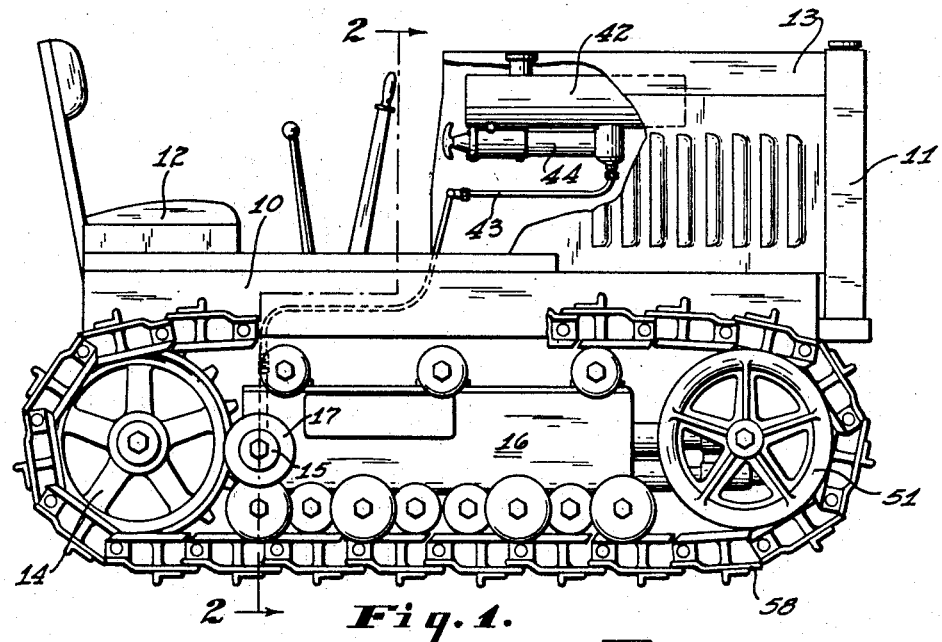
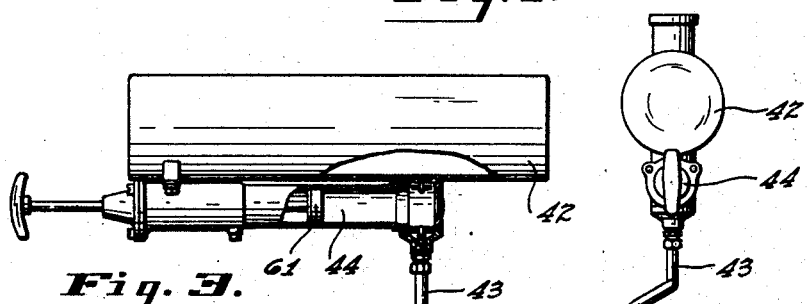
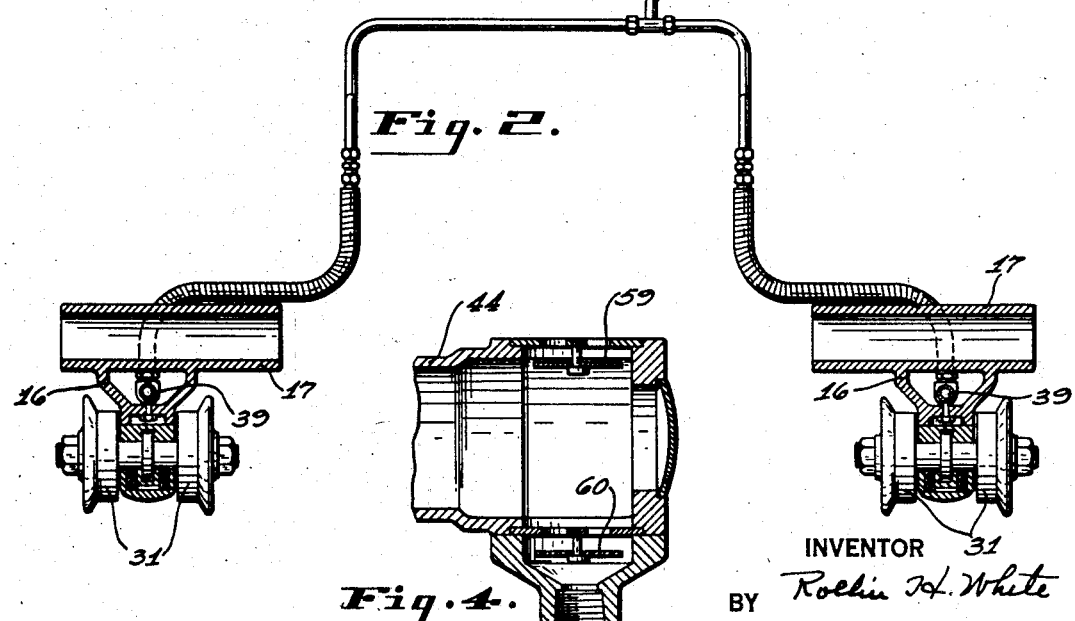

Aug. 1, 1933.    R. H. WHITE    1,920,225
TRACTOR LUBRICATING SYSTEM
Filed May 29, 1930    2 Sheets-Sheet 2

INVENTOR
Rollin H. White
BY
Wayne M. Hart
ATTORNEY

Patented Aug. 1, 1933

1,920,225

UNITED STATES PATENT OFFICE 1,920,225

TRACTOR LUBRICATING SYSTEM

Rollin H. White, Cleveland Heights, Ohio

Application May 29, 1930. Serial No. 457,319

3 Claims. (Cl. 184—7.)

This invention relates to tractors, and more particularly to tractor lubricating systems.

An object of my invention is to provide a lubricating system which feeds oil to a plurality of bearings carried by a tracklaying tractor side frame.

Another object of the invention is to provide a lubricating system which constantly feeds a limited quantity of oil from a reservoir to a bearing.

A further object of my invention is to provide a lubricating system in which oil is conducted from the interior of a tractor side frame to a front idler bearing.

Still another object of the invention is to provide a system for continuously and automatically feeding oil from a reservoir to the lower track wheel bearings of a tracklaying tractor for long periods.

Another object of the invention is to provide a lubricating system for the bearings carried by a tracklaying tractor side frame in which oil is continuously metered for long periods.

Other objects of the invention will appear from the following description taken in connection with the drawings, which form a part of the specification, and in which:

Fig. 1 is a side elevation of a tracklaying tractor showing the assembled lubricating system.

Fig. 2 is a partly diagrammatic and sectional view taken on line 2—2 of Fig. 1.

Fig. 3 is an enlarged view of the pump and the tank.

Fig. 4 is an enlarged fragmentary sectional view of the pump.

Figure 5:
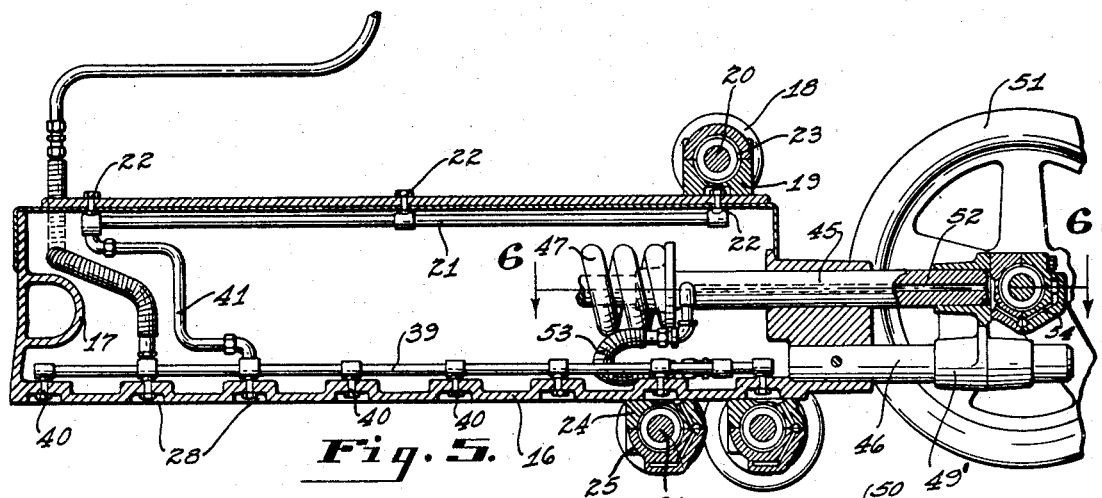
Fig. 5 is a longitudinal sectional view through one of the tractor side frames.
Figure 6:
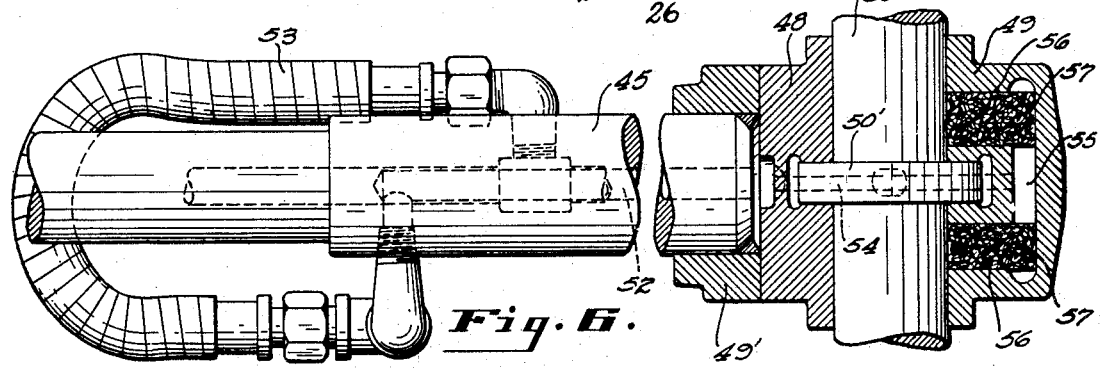
Fig. 6 is an enlarged view of the front idler unit, taken on line 6—6 of Fig. 5.
Figures 7, 8:
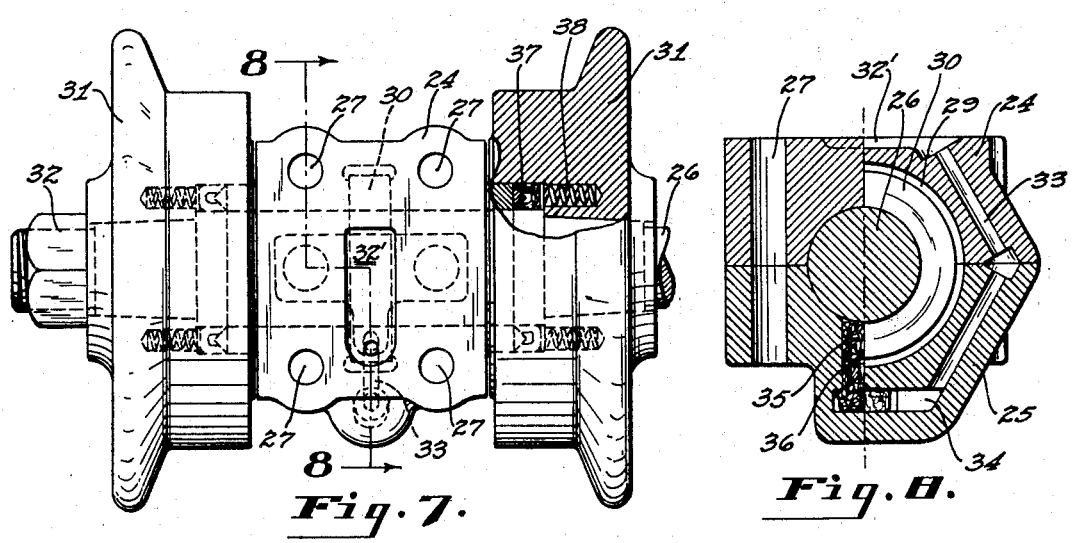
Fig. 7 is a top plan view of one of the roller units.
Fig. 8 is a sectional view taken on line 8—8 of Fig. 7.
Figure 9:
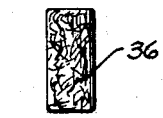
Fig. 9 is a side elevation of a wicking member forming a part of the system.
Figure 10:
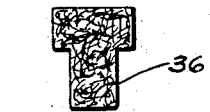
Fig. 10 is a side elevation of a modified form of wicking member.

Referring now to the drawings by characters of reference, 10 represents the main frame of a tracklaying type of tractor upon which is mounted a radiator 11, an operator's seat 12 and an engine (not shown) beneath the hood 13. Driving sprockets, as indicated at 14, are arranged on opposite sides of the tractor and are driven through suitable power transmission mechanism from the engine in a conventional manner.

Fixed axles 15 project from each side of the main frame in advance of the driving sprockets and a track carrying unit is pivotally mounted upon each axle. The track carrying units are similar and therefore a description of one will suffice. A side frame 16 is provided with a sleeve 17 which swivels on a dead axle, such frame being preferably hollow to enclose the main distributing portion of the bearing lubricating system, and of a character to carry the various track engaging roller units usually employed with a tracklaying tractor.

A plurality of upper track supporting roller units are carried by the top wall of the side frame. Each of such units include a bearing comprising two sections 18 and 19 which carry a shaft 20 therebetween, suitable means being employed to secure the bearings to the side frame. A distributing conduit 21 extends longitudinally within the tubular side frame, and branch conduits 22 are secured to the frame and communicate with a passage 23 in each bearing leading to the roller carrying shaft supported thereby. The branch conduits are preferably provided with one way valves (not shown) to prevent oil returning to the distributing conduit from the bearings.

A plurality of lower track roller units are carried by the lower wall of the side frames. Each of such lower roller units include a two part bearing 24 and 25 which are secured together, clamping an axle 26 therebetween, and being fixed to the lower wall of the side frame by bolts, or other suitable means, which pass through the apertures 27. The lower wall of the side frame is pressed upwardly so that when the bearing units are assembled thereover a chamber 28 will thus be formed. The bearing units are formed to provide a circular space 29 within which a thrust flange 30 on the axle is housed, while rollers 31 are secured in fixed relation on the ends of the axles extending beyond the sides of the bearing units. Nuts 32 are screwed upon the ends of the axles to maintain the rollers axially in position. The upper wall of each bearing section 24 is formed with a recess 32¹ forming a part of the chamber 28, and a passage 33 leads through the bearing sections from the chamber to a reservoir 34 formed in the lower section of the bearing unit. A pair of apertures 35 establish communication between the reservoir and the axle at the sides of the thrust flange. Wicking, as indicated at 36, extends through the apertures and is compressed therein for purposes which will hereinafter appear. A sealing ring 37 encircles each end of the shaft and is held against the end of the bearing and the rollers by springs 38. Such rings prevent escape of oil from within the bearing and the entrance of dirt and foreign material into the bearing.

A distributing conduit 39 extends longitudinally within the side frame and is connected to the chambers 28 by branches 40. A branch conduit 41 establishes communication between the distributing conduits 21 and 39. In order to supply oil to the lubricating system of each side frame there is a tank 42 mounted on the superstructure and connected with the conduit 39 by a branching pipe 43, a manually operated pump 44 being interposed between the tank and the pipe.

A front idler structure is associated with each side frame. A pair of shafts 45 and 46 extend through the front of the side frames, the shaft 46 being fixed and the shaft 45 axially movable. Spring means 47, of conventional design, is associated with the shaft 45 to maintain it in forward position and to resist its rearward movement. A bearing, consisting of two sections 48 and 49, is secured to the forward end of the shaft 45, and an axle 50 is carried by the bearing sections. Rollers 51 are secured to the projecting ends of the axle and a thrust flange $50^1$ extending from the axle is housed within the bearings. A bracket $49^1$ is secured to the shaft 45 and is slidable on the shaft 46.

In order to lubricate the axle from the system within the side frames, the shaft 45 is formed with an axially extending passage 52 which communicates with the distributing conduit 39 by means of the connecting conduit 53. The bearing sections 48 and 49 are formed with a passage 54 leading from the passage in the shaft 45 to a reservoir 55 formed in the front portion of the bearing. Apertures 56 extend between the reservoir and the axle, and wicking members 57 extend therethrough.

An articulated track belt 58 is arranged on each side of the tractor. Such belts extend around the sprocket, front idler roller, and the upper and lower rollers.

The pump has a one way valve 59 controlling the opening from the tank, and another one way valve 60 controlling the opening leading to the outlet conduit. As the plunger 61 is moved in one direction oil is sucked into the pump cylinder from the tank, while moved in the opposite direction the oil will be moved under pressure through the system filling the reservoirs in each of the roller and idler units. The wicking members and feed oil from the reservoirs to the adjacent axles and the seal rings prevent the oil escaping, the front idlers and upper rollers having seal rings similar to those described in connection with the lower roller units. The degree to which the wicking members are compressed determines the rate at which oil is fed from the reservoirs to the shafts. It will be seen that the oil flow can be regulated to suit the lubrication desired, and that there is a constant lubrication so long as there is oil in the reservoirs. With the system described it is only necessary to operate the pump occasionally to cause continued lubrication of all the bearings carried by the side frames. The system meters the oil because it also introduces only the amount of oil desired to the axles, the seals preventing escape of oil outwardly from the bearings.

Although this invention has been described in connection with certain specific embodiments, the principles involved are susceptible of numerous other applications which will readily occur to persons skilled in the art, and the invention is therefore to be limited only as indicated by the scope of the appended claims.

What I claim is:—

1. In a tracklaying tractor, a hollow pivoted side frame, a longitudinally sliding hollow shaft extending forwardly from the side frame, a front idler bearing carried by the sliding hollow shaft, means establishing communication between the hollow shaft and the interior of the bearing and a lubricating conduit in the hollow side frame connected to the interior of the shaft.

2. In a lubricating device for tracklaying tractors, a tubular side frame, a longitudinally movable hollow shaft extending through and forwardly of said side frame and carrying a bearing at its end, said bearing being in communication with the hollow shaft, a lubricating conduit in the side frame receiving lubricant under pressure and a flexible pipe leading from the lubricating conduit to the hollow shaft.

3. In a tracklaying tractor, a hollow side frame, a lubricating conduit housed therein, a hollow shaft carrying an idler bearing at one end supported for sliding movement in the side frame, a lubricant passageway between the hollow shaft and the bearing and a flexible pipe connected to the lubricating conduit housed in the side frame and the bore of the hollow shaft supplying lubricant to said idler bearing.

ROLLIN H. WHITE.